United States Patent Office 3,586,539
Patented June 22, 1971

3,586,539
LEAD ACCUMULATOR WITH DRY STORAGE STABLE CHARGED ELECTRODE PLATES
Helmut Lauck, Hofheim, Germany, assignor to Varta Aktiengesellschaft, Frankfurt am Main, Germany
No Drawing. Filed Aug. 21, 1969, Ser. No. 852,122
Claims priority, application Germany, Aug. 24, 1968, P 17 96 066.6
Int. Cl. H01m 9/00, 39/00
U.S. Cl. 136—26        12 Claims

ABSTRACT OF THE DISCLOSURE

Lead accumulators with dry, storage stable, charged electrode plates, the housing of which contains concentrated sulfuric acid and which is filled with water for activation, wherein the sulfuric acid is present as a gel of acrylic acid, methacrylic acid, or acrylamide and a cross-linking compound.

---

This invention relates to a lead accumulator having dry, storage stable, charged electrode plates, the housing of which contains concentrated sulfuric acid and which is filled with water prior to activation.

According to the state of the art as concerns accumulators, lead accumulators having so-called dry, charged, storage-stable electrode plates, having the particular advantage that for activation they need only be filled with sulfuric acid, have already been made by different techniques, as a result of which it has been made possible to sell an accumulator together with the electrolyte. There have been proposed a number of procedures making it possible to achieve final activation of the accumulator by only filling the accumulator with water, the required sulfuric acid in concentrated form being already present in the finished accumlator.

For instance, according to one proposal, a container similar to the lead accumulator is prepared from a synthetic resin. The dilute sulfuric acid is present in this container and is introduced into the accumulator for activating it. Such an arrangement has the disadvantage that considerable space is required for the accumulator and for the electrolyte container.

Further, it has already been proposed, that sulfuric acid in concentrated form is placed on the housing bottom, the accumulator being set into operation by addition of water.

According to another proposal, the concentrated sulfuric acid is present in a sealed synthetic resin container arranged above the cell block. This container must be constructed of a synthetic resin material not subject to attack by sulfuric acid but which is a synthetic resin soluble in an organic solvent. Above this container, there is arranged a further sealed container which holds the organic solvent. This second container is constructed of a water soluble material. On filling the accumulator with water, the container holding the organic solvent is destroyed, the resultant release of organic solvent in turn dissolves the sulfuric acid container and the concentrated sulfuric acid is then mixed with the water. Such an arrangement is quite expensive and furthermore at best is not reliable in operation.

The object of the invention is to provide an accumulator with a solid concentrated electrolyte which can be activated easily and without difficulty and which is storage stable over prolonged periods.

The heretofore known solid electrolytes, which have been prepared by admixing with pectin and the like, are not suitable for use in accomplishing the object of the invention, particularly because of their requirement for increased space. Concentrated sulfuric acid cannot be solidified with the known thickening agents because these are subject to attack by concentrated sulfuric acid and further do not give rise to stable gels. The known inorganic thickening agents must be used in such large amounts that they also cannot be used. In addition, in the latter case, during the activation, the temperature increases to a degree not capable of being handled.

In accordance with the invention it has now been found that the disadvantages of the art are avoided and the above object accomplished by an accumulator having the necessary concentrated sulfuric acid present in the form of a gel of acrylic acid, methacrylic acid or acrylic acid amide and a cross-linking compound. The gel is clear and stable but still elastical; it is yellow shaded, said yellow shade becoming brighter in colour in correspondence with the concentration of the stabilized sulphuric acid.

Most advantageously the sulfuric acid gel lies on a porous foil, for instance a polyethylene foil, of small dimensions arranged above the plate block. It is also possible for the gel to be fixed in a fleece, as for instance a glass fleece or web, which fleece can be covered by separators on both sides and then placed between the plates of the accumulator. In order to prevent the penetration of moisture into the accumulator during storage, the accumulator is sealed air-tight.

The preparation of the sulfuric acid gels according to the invention is carried out by cross-linking and solidifying to a gel, 60 to 95% sulfuric acid, preferably 75 to 85% sulfuric acid with 3 to 10%, by weight of the sulphuric acid preferably 4 to 6% acrylic acid, methacrylic acid or acrylic acid amide with a cross-linking organic compound such as methylene-bis-acrylamide or acrylic acid triallyl ester or cyanuric acid triallyl ester or mixtures of these compounds and a catalyst.

As catalyst, there are suitable peroxides and persulfates and in particular ammonium persulfate.

In order to obtain as complete an activation as possible and to have a foil of low electrical resistance and high porosity, it is advantageous to incorporate in the mixture to be cross-linked a substance for increasing porosity. In this connection, it is advantageous to use kieselguhr in an amount of 50 to 70% by weight of the total mixture and preferably in an amount of 60%. Foils of this composition can be used directly as separators arranged between the electrode plates of the accumulator.

The following examples are given in order to further illustrate the invention and are in no wise to be construed as limiting the scope thereof.

EXAMPLE 1

5.0 g. acrylic acid and 0.4 g. methylene-bis-acrylamide were mixed together. The resultant mixture was then stirred into 94.6 g. 80% sulfuric acid and then 0.12 g. ammonium persulfate were introduced. After the persulfate had gone into solution, the mixture was warmed up to 70° C. In about 15 minutes, solidification set in. The gel, following cooling was comminuted, admixed with 0.2% aluminum stearate and arranged in a layer on a polyethylene foil deposited on the plates. The activation was accomplished by introducing water up to a filling height above the gel. The gel then provides the sulfuric acid in a short time and under decreased temperature elevation.

EXAMPLE 2

As set out in Example 1, a gel was prepared using instead of acrylic acid 5.0 g. methacrylic acid. The further procedure as set out in Example 1 was also followed with the same results.

EXAMPLE 3

5.0 g. acrylic acid, 1.0 g. methacrylic acid allylester and 94.0 g. 70% sulfuric acid were mixed together, 0.14 g. ammonium persulfate were then added and the procedure as set out in Example 1 thereafter followed.

EXAMPLE 4

Example 3 was followed but instead of 1.0 g. methacrylic acid allylester, 1.0 g. cyanuric acid triallylester was used.

EXAMPLE 5

6.0 g. acrylic acid, 1.0 g. methylene-bis-acrylamide, 93.0 g. 90% sulfuric acid and 0.3 g. ammonium persulfate were dissolved and the solution in a layer thickness of 1.5 mm. poured onto a glass fleece having a thickness of 0.5 mm. and there polymerized at 80° C. Following solidification, the reinforced gel was cut into sections, the sections placed between two ribbed PVC separators and this placed between the electrodes in place of a conventional separator. The activation took place in a short time by introducing pure water into the finished battery, under only low temperature increases.

EXAMPLE 6

As set out in Example 5, a solution of acrylic acid, methylene-bis-acrylamide and ammonium persulfate were prior to polymerization admixed with 60 wt. percent of 90% sulfuric acid impregnated kieselguhr.

What is claimed as new and desired to be protected by Letters Patent is set forth in the appended claims:

1. A gel electrolyte consisting essentially of polymerization reaction product of concentrated sulfuric acid, a member selected from the group consisting of acrylic acid, methacrylic acid, and acrylic acid amide and a cross-linking polymerizable organic compound having at least two unsaturated bonds.

2. A gel electrolyte according to claim 1 wherein said sulfuric acid has a concentration of 60 to 95%.

3. A gel electrolyte according to claim 1 wherein said sulfuric acid has a concentration of 75 to 85%.

4. A gel electrolyte according to claim 1 wherein said group member is present in an amount of 3 to 10% by weight of the sulfuric acid.

5. A gel electrolyte according to claim 1 wherein said cross-linking polymerizable organic compound is at least one member selected from the group consisting of methylene-bis-acrylamide, methacrylic acid allylester and cyanuric acid triallylester.

6. A gel electrolyte according to claim 1 wherein prior to polymerization said electrolyte has incorporated therein a catalyst.

7. A gel electrolyte according to claim 6 wherein said catalyst is a member selected from the group consisting of peroxides and persulfates.

8. A gel electrolyte according to claim 7 wherein said catalyst is ammonium persulfate.

9. A gel electrolyte according to claim 1 wherein prior to polymerization said electrolyte has incorporated therein 50–70% by weight, of the total electrolyte, kieselguhr saturated with sulfuric acid.

10. Lead accumulator having dry, storage-stable, charged electrode plates, the housing of which contains sulfuric acid and is filled up with water prior to activation wherein said sulfuric acid is present in the form of a gel, said gel being polymerization reaction product of concentrated sulfuric acid, a member selected from the group consisting of acrylic acid, methacrylic acid, and acrylic acid amide and a cross-linking polymerizable organic compound having at least two unsaturated bonds.

11. Lead accumulator according to claim 10 wherein said sulfuric acid gel lies on a porous foil above the electrode plates in the form of pellets.

12. Lead accumulator according to claim 10 wherein said sulfuric acid is incorporated into a fleece, which is covered over with a separator and positioned between the electrode plates.

References Cited

UNITED STATES PATENTS

| | | | |
|---|---|---|---|
| 2,596,046 | 5/1952 | Roth | 252—317 |
| 2,684,950 | 7/1954 | Rivers et al. | 252—317 |
| 2,866,840 | 12/1958 | Dittmann et al. | 136—26 |
| 3,018,316 | 1/1962 | Higgins et al. | 136—144 |
| 3,324,068 | 6/1967 | Michaels | 136—146X |
| 3,328,208 | 6/1967 | Ryhiner | 136—157 |
| 3,419,430 | 12/1968 | Michaels | 136—26 |

WINSTON A. DOUGLAS, Primary Examiner

A. SKAPARS, Assistant Examiner

U.S. Cl. X.R.

136—157, 158; 252—317